Figure 1:
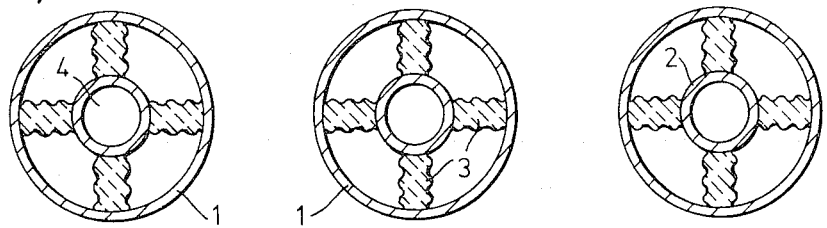

United States Patent [19]

Rogers et al.

[11] 4,321,422
[45] Mar. 23, 1982

[54] BUSBAR INSTALLATION

[75] Inventors: Edward C. Rogers, Putney; Derek R. Edwards, Windsor, both of England

[73] Assignee: BICC Limited, London, England

[21] Appl. No.: 82,881

[22] Filed: Oct. 9, 1979

Related U.S. Application Data

[63] Continuation of Ser. No. 862,646, Dec. 20, 1977, abandoned.

[30] Foreign Application Priority Data

Dec. 20, 1976 [GB] United Kingdom ............... 53030/76

[51] Int. Cl.³ .............................................. H01B 7/34
[52] U.S. Cl. ............................ 174/15 C; 165/104.21; 174/16 B; 174/28
[58] Field of Search ................. 174/15 C, 15 R, 15 S, 174/16 B, 28; 165/105

[56] References Cited

U.S. PATENT DOCUMENTS

| | | | |
|---|---|---|---|
| 3,102,740 | 9/1963 | Plummer | 174/15 C |
| 3,463,869 | 8/1969 | Cooley et al. | 174/15 S |
| 3,646,243 | 2/1972 | Graneau et al. | 174/15 S |
| 3,800,062 | 3/1974 | Kataoka et al. | 174/15 S |
| 3,808,351 | 4/1974 | Moisson-Franckhauser | 174/15 S |
| 3,835,240 | 9/1974 | Matthaus | 174/15 S |
| 3,962,529 | 6/1976 | Kubu | 174/15 C |
| 4,020,274 | 4/1977 | Dean | 174/15 S |
| 4,091,230 | 5/1978 | Rabinowitz et al. | 174/15 C |
| 4,106,557 | 8/1978 | Sonobe et al. | 174/15 R |

FOREIGN PATENT DOCUMENTS

46-37547 of 1971 Japan ................... 174/15 C

*Primary Examiner*—Arthur T. Grimley
*Attorney, Agent, or Firm*—Buell, Blenko, Ziesenheim & Beck

[57] ABSTRACT

An electric busbar installation comprises at least one busbar comprising a rigid bare elongate conductor housed within and rigidly secured to and spaced from a rigid tube, arranged with its axis substantially vertical by longitudinally spaced rigid insulators, the space between the busbar and the tube containing an electrically insulating fluid which is in direct contact with the bare conductor of the busbar, at least one duct which is in thermal association with the bare conductor throughout the length of the busbar and which forms part of a closed circulatory system for evaporable refrigerant; and interconnected in the circulatory system, condensing means for receiving evaporated refrigerant from, and for delivering liquid refrigerant to, the duct. Artificial cooling of the busbar is effected by extraction from the bare conductor of the heat generated by the busbar when it is on load, which heat raises the temperature of the bare conductor to such an extent as to evaporate liquid refrigerant being caused to flow along the duct to the condensing means where it is cooled and condensed to liquid form for re-circulation along the duct.

9 Claims, 6 Drawing Figures

BUSBAR INSTALLATION

This is a continuation of application Ser. No. 862,646, filed Dec. 20, 1977, now abandoned.

This invention relates to electric busbar installations and is particularly concerned with artificial cooling of electric busbar installations. More especially, but not exclusively, the invention is concerned with artificial cooling of isolated phase electric busbar installations of the kind in which each isolated phase busbar is arranged with its axis substantially vertical or lying at a substantial angle to the horizontal and which, for example, may be employed in electric power stations, mines and multi-storey buildings.

According to the present invention an improved electric busbar installation comprises at least one busbar comprising a substantially rigid bare elongate conductor housed within and rigidly secured to and spaced from a substantially rigid tube by longitudinally spaced rigid insulators, the space between the busbar and the tube containing an electrically insulating fluid which is in direct contact with the bare conductor of the busbar arranged with its axis substantially vertical, at least one duct which is in thermal association with the bare conductor throughout the length of the busbar and which forms part of a closed circulatory system for evaporable refrigerant; and interconnected in the circulatory system, condensing means for receiving evaporated refrigerant from, and for delivering liquid refrigerant to, the duct; the arrangement being such that artificial cooling of the busbar is effected by extraction from the bare conductor of the heat generated by the busbar when it is on load, which heat raises the temperature of the bare conductor to such an extent as to evaporate liquid refrigerant being caused to flow along the duct to the condensing means where it is cooled and condensed to liquid form for re-circulation along the duct.

Preferably the or each substantially rigid bare elongate conductor is in the form of a tube and the bore of the tube arranged with its axis substantially vertical constitutes the duct in thermal association with the bare conductor but, in some circumstances, the duct in thermal association with the or each elongate conductor may be the bore of the substantially rigid tube in which the or each elongate conductor is housed. In this latter case, the evaporable refrigerant will constitute the electrically insulating fluid and the substantially rigid tube will be of fluid-impermeable material.

The or each busbar of the installation is preferably arranged with its axis substantially vertical, or at a substantial angle to the horizontal and preferably refrigerant flows to the condensing means thermosyphonically and liquid refrigerant flows from the condensing means under the action of gravity.

Artificial cooling of the elongate conductor of the or each busbar of an electric busbar installation by evaporation of a liquid refrigerant in thermal association with the conductor has the important advantage that the evaporative cooling is self-regulating and will come into operation automatically when the temperature of the conductor exceeds the temperature of the condensing means.

Where a busbar installation is of great length, the length of the or each busbar may be sub-divided into sections and each of these sections may have its own separate closed circulatory system for evaporable refrigerant. In this case, the closed circulatory system of each section of the busbar will have its own condensing means and refrigerant reservoir.

In some circumstances, each of two or more busbars, or a section of each of two or more busbars, may be cooled by a common closed circulatory system for evaporative refrigerant.

In an alternative arrangement sections of the busbar or of each of two or more busbars, may be cooled by a common closed circulatory system for evaporable refrigerant having a single condensing means. The duct of each of these sections of the busbar or of each busbar is fed with evaporable refrigerant from an associated refrigerant reservoir, each reservoir except that reservoir remote from the condensing means being connected to a succeeding reservoir in the closed circulatory system by an overflow pipe. The refrigerant reservoir of each section of the or a busbar, except the section remote from the condensing means, may be constituted by the part of the circulatory system extending between the section and the overflow pipe.

In all cases, when the closed circulatory system is sealed and before the busbar installation is put on load, the refrigerant will be stationary and the duct thermally associated with the or each conductor will be substantially filled with liquid refrigerant.

It is preferred to employ as the condensing means air-cooled or water-cooled heat exchangers and, where the busbar installation is housed in an underground shaft, the condensing means can be conveniently located above ground.

Suitable evaporable refrigerants that may be employed include carbon tetrachloride, methyl chloride, ammonia, methanol, a hydrocarbon, e.g. $C_3H_8$, $C_4H_{10}$, $C_5H_{12}$, and a fluorocarbon, e.g. $CHClF_2$.

Figure 2:
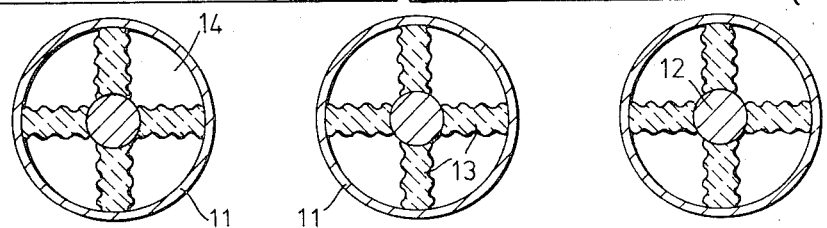
Figure 3:
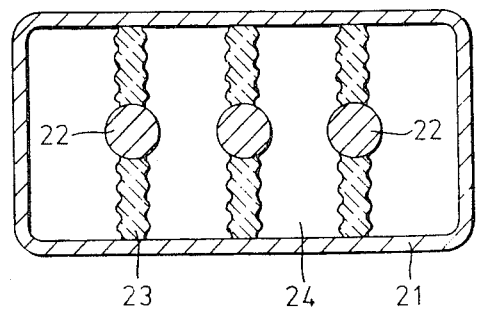
Figure 4:
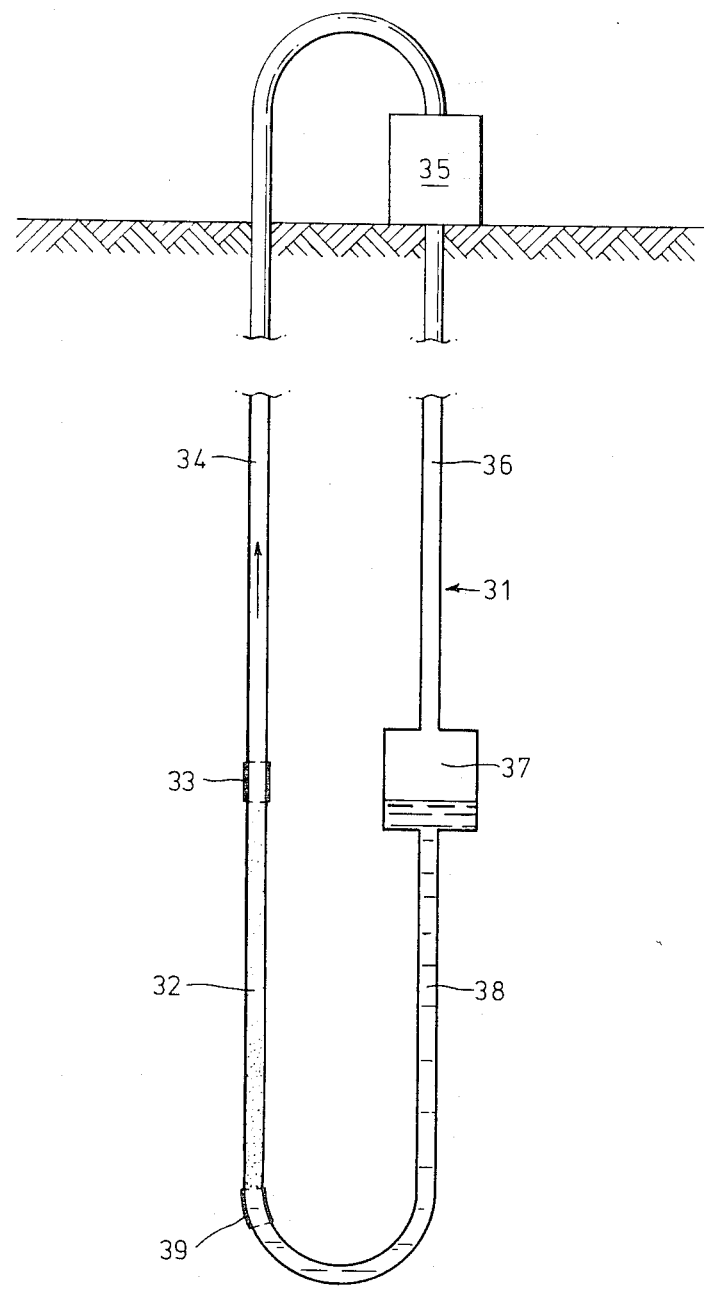
Figure 5:
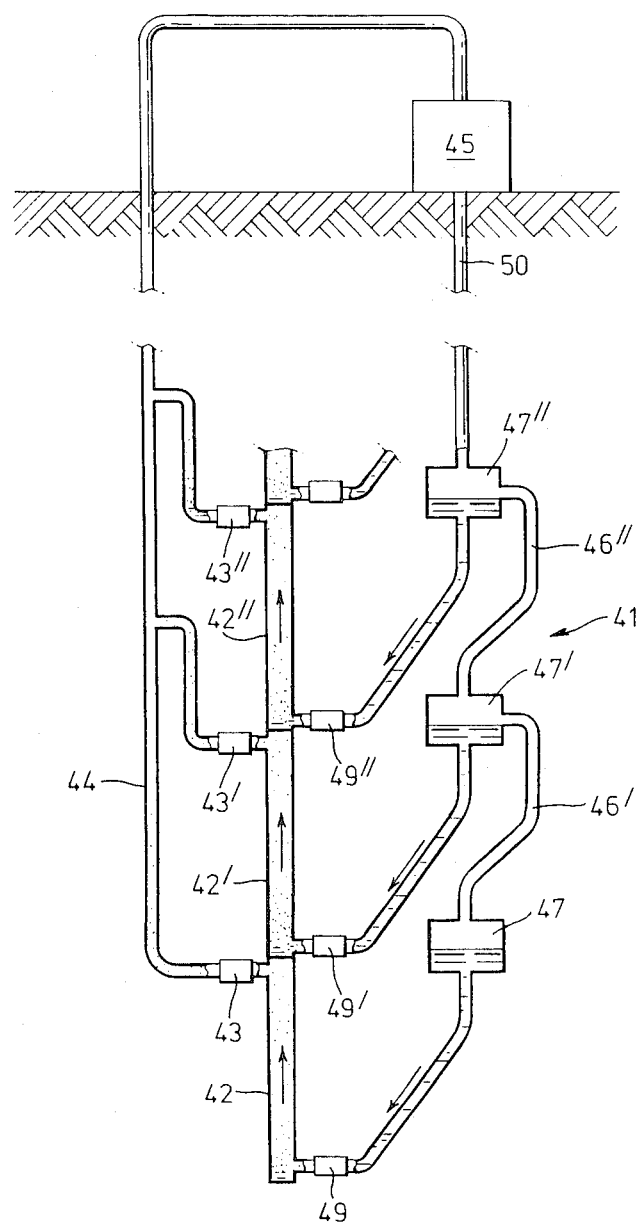
Figure 6:
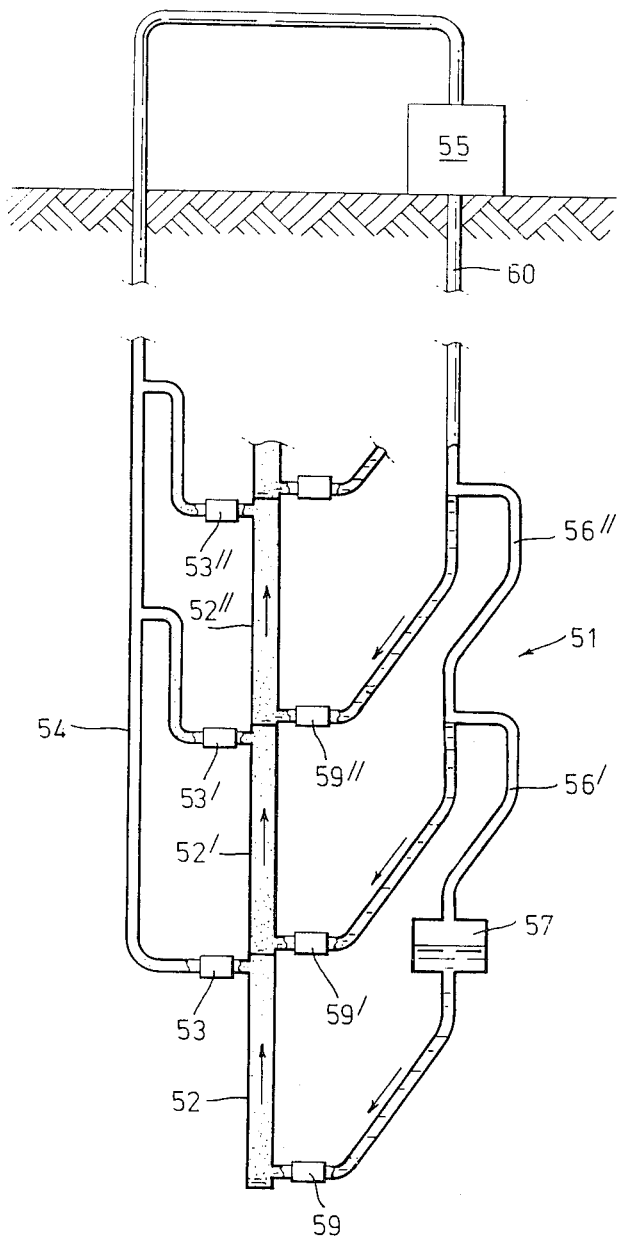

The invention is further illustrated by a description, by way of example, of three forms of electric busbar installation with reference to the accompanying drawings, in which:

FIGS. 1, 2 and 3 are transverse cross-sectional views illustrating three alternative arrangements of rigid conductors in a busbar installation;

FIG. 4 shows, diagrammatically, the arrangement for artificially cooling one section of one busbar of an isolated phase busbar installation housed underground in a substantially vertical shaft; and FIGS. 5 and 6, respectively, show diagrammatically two alternative arrangements for artificially cooling one busbar of an isolated busbar installation housed underground in a substantially vertical shaft.

FIG. 1 shows an isolated phase busbar installation comprising three rigid metal tubes 1 in each of which is housed a substantially rigid bare elongate tubular conductor 2, each tubular conductor being secured to and insulated from the tube in which it is housed at spaced positions along the tube by rigid insulators 3. The bore 4 of the tubular conductor 2 constitutes the duct through which the evaporable refrigerant is caused to flow for artificially cooling the busbar.

In an alternative form of isolated phase busbar installation shown in FIG. 2, each of three rigid metal tubes 11 houses a substantially rigid elongate conductor 12, each conductor being secured to and insulated from the tube in which it is housed at spaced positions along the tube by rigid insulators 13. The space 14 between each conductor 12 and its surrounding tube 11 constitutes the duct through which flows evaporable refrigerant with electrical insulating properties.

In the busbar installation shown in FIG. 3, three rigid conductors 22 are housed in a common metal tube 21, the conductors being secured to and insulated from the tube by rigid insulators 23. Evaporable electrical insulating refrigerant flows in the space 24 between the conductors 22 and the tube 21.

Referring to FIG. 4, each busbar of the isolated phase busbar installation is housed underground in a substantially vertical shaft, 200 m in length, and dissipates 300 W/m when on full load. Each busbar is divided along its length into substantially fluid-tight sections, of which one section 32 only is diagramatically illustrated, and each section has its own separate closed circulatory system 31 for evaporable refrigerant, the closed circulatory system of each section having its own condensor 35 and refrigerant reservoir 37. Thus, in FIG. 4, the upper end of the section 32, of length 30 m, of the hollow conductor of one busbar is connected via an electrically insulating coupling 33 to a pipe 34 connected to the condenser 35 located above the ground. Extending downwardly from the condensor 35 is a pipe 36 which is connected to the refrigerant reservoir 37 located 170 m below ground level. The reservoir 37 is connected by a pipe 38 via an electrically insulating coupling 39 to the lower end of the section 32. The section 32, condensor 35, reservoir 37 and interconnecting pipes 34, 36 and 38 constitute the closed circulatory system 31 for evaporable refrigerant.

If this busbar installation were to be cooled by forced water circulation, a static pressure of 284 p.s.i.g. would be required, which is excessive. Each vertically-extending busbar could be divided into sections, e.g. of 30 m length, and each section cooled separately by forced water circulation, but heat dissipated at each of the sections would have to be removed to ground level and this would necessitate the provision of a secondary cooling circuit, e.g. using forced air circulation, with the result that artificial cooling of the busbar installation by this means is complicated and expensive.

In contradistinction, if, as diagrammatically illustrated in FIG. 4, each section 32 of each isolated phase busbar is cooled by arranging for evaporable refrigerant to flow through the hollow conductor of the busbar section, then heat can be conveyed by evaporative refrigerant to the condenser 35 positioned above ground without the need for a secondary cooling system and without the need for circulating pumps. Moreover, by appropriate choice of evaporative refrigerant, the need for high static pressures is avoided. Thus, if the section 32 of tubular conductor shown in FIG. 4 operates at about 80° C., carbon tetrachloride, which at atmospheric pressure boils at 76° C., is a suitable refrigerant and the maximum pressure in the system is 63 p.s.i.g.

In the isolated phase busbar installation shown in FIG. 5 each busbar (of which one only is shown) is housed underground in a substantially vertical shaft and its tubular conductor is divided along its length into a plurality of substantially fluid-tight sections 42, $42^1$, $42^{11}$ . . . which are cooled by a common closed circulatory system 41 for evaporable refrigerant. The upper end of each section 42, $42^1$, $42^{11}$ . . . is connected via an electrically insulating coupling 43, $43^1$, $43^{11}$ . . . to a common vapour return pipe 44 connected to a condensor 45 located above the ground.

The lower end of each section 42, $42^1$, $42^{11}$ . . . is connected via an electrically insulating coupling 49, $49^1$, $49^{11}$ . . . to an associated refrigerant reservoir 47, $47^1$, $47^{11}$ . . . . Each reservoir 47, $47^1$, $47^{11}$ . . . , except the reservoir remote from the condensor 45, is connected to the reservoir immediately below it by an overflow pipe $46^1$, $46^{11}$ . . . ; the uppermost reservoir is connected to the condenser by a pipe 50.

As the temperature of each section 42, $42^1$, $42^{11}$ . . . rises, the evaporable refrigerant caused by gravity to flow through each section evaporates and flows through the pipe 44 to the condenser 45 where it is liquefied and flows via the pipe 50 to the uppermost reservoir. As the amount of liquid refrigerant in each reservoir $47^1$, $47^{11}$ . . . rises above the opening of the overflow pipe $46^1$, $46^{11}$ . . . liquid refrigerant flows via the overflow pipe to the reservoir immediately below.

The isolated phase busbar installation shown in FIG. 6 is similar to that shown in FIG. 5 and, where appropriate, corresponding parts have been given numerical references greater by ten than the references to corresponding parts of the installation shown in FIG. 5. The installation differs from that shown in FIG. 5 in that all the reservoirs, except the lowermost reservoir 57, are omitted, the pipes $56^1$, $56^{11}$ . . . constituting effective reservoirs for each section $52^1$, $52^{11}$ . . . except the lowermost section.

What we claim as our invention is:

1. An electric busbar installation comprising a substantially rigid tube arranged with its axis substantially vertical, at least one busbar comprising a substantially rigid bare elongate conductor housed within and rigidly secured to and spaced from said rigid tube by longitudinally spaced rigid insulators, the space between the busbar and the tube containing an electrically insulating fluid which is in direct contact with the bare conductor of the busbar, a closed circulatory system for evaporable refrigerant, at least one duct which is in thermal association with the bare conductor throughout the length of the busbar and which forms part of the circulatory system, and interconnected in the circulatory system, condensing means for receiving evaporated refrigerant from, and for delivering liquid refrigerant to, the duct, the arrangement being such that artifical cooling of the busbar is effected by extraction from the bare conductor of the heat generated by the busbar when it is on load, which heat raises the temperature of the bare conductor to such an extent as to evaporate liquid refrigerant being caused to flow along the duct to the condensing means where it is cooled and condensed to liquid form for re-circulation along the duct.

2. An electric busbar installation comprising a substantially rigid tube arranged with its axis substantially vertical, at least one busbar comprising a substantially rigid bare elongate tubular conductor housed within and rigidly secured to and spaced from said rigid tube by longitudinally spaced rigid insulators, the space between the busbar and the tube containing an electrically insulating fluid which is in direct contact with the bare tubular conductor of the busbar, a closed circulatory system for evaporable refrigerant of which the bore of the bare tubular conductor forms a part, and interconnected in the circulatory system, condensing means for receiving evaporated refrigerant from, and for delivering liquid refrigerant to, the bore of the bare tubular conductor, the arrangement being such that artificial cooling of the busbar is effected by extraction from the bare tubular conductor of the heat generated by the busbar when it is on load, which heat raises the temperature of the bare tubular conductor to such an extent as to evaporate liquid refrigerant being caused to flow along the bore of the bare tubular conductor to the condensing means where it is cooled and condensed to liquid form for recirculation along the bore of the tubular conductor.

3. An electric busbar installation comprising a substantially rigid tube of fluid impermeable material arranged with its axis substantially vertical, at least one busbar comprising a substantially rigid bare elongate conductor housed within and rigidly secured to and spaced from said rigid tube by longitudinally spaced insulators, the space between the busbar and the tube containing evaporable electrically insulating refrigerant which is in direct contact with the bare conductor of the busbar, a closed circulatory system for said evaporable electrically insulating refrigerant of which the tube forms a part, and interconnected in the circulatory systems, condensing means for receiving evaporated refrigerant from, and for delivering liquid refrigerant to, the tube, the arrangement being such that artificial cooling of the busbar is effected by extraction from the conductor of the heat generated by the busbar when it is on load, which heat raises the temperature of the bare conductor to such an extent as to evaporate liquid refrigerant being caused to flow along the tube to the condensing means where it is cooled and condensed to liquid form for re-circulation along the tube.

4. An electric busbar installation as claimed in claim 1, wherein refrigerant flows to the condensing means thermosyphonically and liquid refrigerant flows from the condensing means under the action of gravity.

5. An electric busbar installation as claimed in claim 1, wherein each of at least two busbars, or a section of each of at least two busbars, are cooled by a common closed circulatory system for evaporable refrigerant.

6. An electric busbar installation as claimed in claim 1, wherein the condensing means is a fluid-cooled heat exchanger.

7. An electric busbar installation comprising a substantially rigid tube arranged with its axis substantially vertical, at least one busbar comprising a substantially rigid bare elongate conductor housed within and rigidly secured to and spaced from said rigid tube by longitudinally spaced rigid insulators, the tube being divided at spaced positions along its length into substantially fluid-tight sections and the space between the busbar and the tube in each of said sections containing an electrically insulating fluid which is in direct contact with the bare conductor of the busbar, associated with each of said sections a separate closed circulatory system for evaporable refrigerant, each of which circulatory systems includes at least one duct which is in thermal association with the conductor throughout the length of the associated section of the busbar and which forms part of said circulatory system and, interconnected in each of said circulatory systems, a refrigerant reservoir and condensing means for receiving evaporated refrigerant from, and for delivering liquid refrigerant to, the associated duct, the arrangement being such that artificial cooling of the busbar is effected by extraction from the bare conductor of the heat generated by each of said sections of the busbar when the busbar is on load, which heat raises the temperature of the bare conductor to such an extent as to evaporate liquid refrigerant being caused to flow along the duct of each of said sections to the associated condensing means where it is cooled and condensed to liquid form for re-circulation along said duct.

8. An electric busbar installation as claimed in claim 7, wherein the reservoir of each section of the or a busbar, except the section remote from the condensing means, is constituted by the part of the circulatory system extending between the section and the overflow pipe.

9. An electric busbar installation comprising a substantially rigid tube arranged with its axis substantially vertical, at least one busbar comprising a substantially rigid bare elongate conductor housed within and rigidly secured to and spaced from rigid tube by longitudinally spaced rigid insulators, the tube being divided at spaced positions along its length into sections and the space between the busbar and the tube in each of said sections containing an electrically insulating fluid which is in direct contact with the bare conductor of the busbar, a closed circulatory system for evaporable refrigerant, at least one duct which is in thermal association with the conductor throughout the length of each of said sections of the busbar, a plurality of refrigerant reservoirs, each associated with the duct of one of said sections of the busbar, the ducts of said sections of the busbar forming part of the circulatory system and, interconnected in the circulatory system, condensing means for receiving evaporated refrigerant from, and for delivering liquid refrigerant to, the ducts, each reservoir except that reservoir remote from the condensing means being connected to a succeeding reservoir in the closed circulatory system by an overflow pipe, the arrangement being such that artificial cooling of the busbar is effected by extraction from the bare conductor of the heat generated by each of said sections of the busbar when the busbar is on load, which heat raises the temperature of the bare conductor to such an extent as to evaporate liquid refrigerant being caused to flow along the duct of each of said sections to the condensing means where it is cooled and condensed to liquid form for re-circulation along said duct.

* * * * *